Dec. 5, 1967  JAMES E. WEBB  3,355,861
ADMINISTRATOR OF THE NATIONAL AERONAUTICS
AND SPACE ADMINISTRATION
MIXTURE SEPARATION CELL
Filed Jan. 6, 1966  2 Sheets-Sheet 1
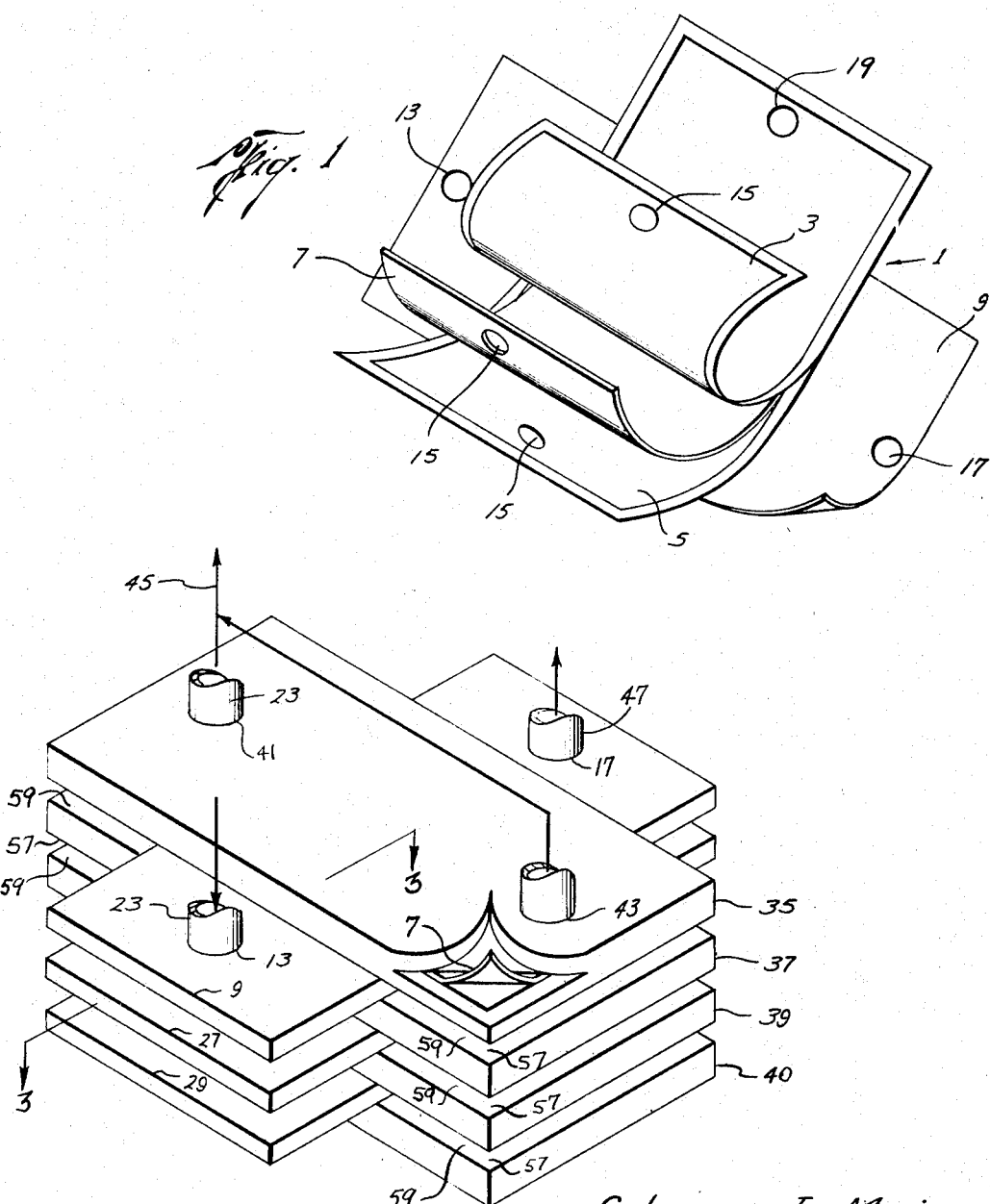
Coleman J. Major
Karl Kammermeyer
Richard W. Tock
INVENTORS
BY  *H. McCoy*
*Bernard A. Reiter*
ATTORNEYS Dec. 5, 1967 JAMES E. WEBB 3,355,861
ADMINISTRATOR OF THE NATIONAL AERONAUTICS
AND SPACE ADMINISTRATION
MIXTURE SEPARATION CELL Filed Jan. 6, 1966 2 Sheets-Sheet 2

Coleman J. Major
Karl Kammermeyer
Richard W. Tock
INVENTORS

BY *G. H. McCoy*
*Bernard A. Reiter*

ATTORNEYS

United States Patent Office 3,355,861
Patented Dec. 5, 1967

3,355,861
MIXTURE SEPARATION CELL
James E. Webb, Administrator of the National Aeronautics and Space Administration, with respect to an invention of Coleman J. Major, Tallmadge, Ohio, and Karl Kammermeyer and Richard W. Tock, both of Iowa City, Iowa
Filed Jan. 6, 1966, Ser. No. 519,160
6 Claims. (Cl. 55—158)

ABSTRACT OF THE DISCLOSURE

A separation cell for separating fluid mixture components by permeation through stacked permeation units, each of which is connected to a supply conduit for receiving the mixture and to removal conduits for withdrawing the mixture components. Each permeation unit is comprised of a permeable selective membrane and a porous conduit sheet in fluid communication with the supply conduit and in an abutting laminar relationship with the membrane. The porous sheets provide support for the membranes and restrictive flow paths for conducting the fluid mixture to the membranes. The stacked permeation units are arranged with the perm-selective membranes disposed in alternating transverse relationship with the porous conduit sheets so that only a portion of the surface areas of the abutting membranes and porous conduit sheets provide the permeation surface. Each perm-selective membrane sealingly encloses a porous paper substrate which transmits mixture components which have permeated the membrane. The supply and removal conduits for the unpermeated components are connected to the porous conduit sheets on opposite sides of the contacting surface areas and at opposite ends of the porous conduit sheets. A bore which extends through the perm-selective membranes and the porous paper substrates accommodates a removal conduit for the permeated fluids.

The invention described herein was made in the performance of work under a NASA contract and is subject to the provision of Section 305 of the National Aeronautics and Space Act of 1958, Public Law 85–568 (72 Stat. 435; 42 U.S.C. 2457).

---

This invention relates to a device for separating constituents of fluid mixtures. More particularly, it is directed to the apparatus and method of construction for an improved gas permeability cell.

It will be recognized that the principles of construction disclosed hereinafter may be utilized in separation devices for either liquids, vapors, or gases or combination mixtures of the three. The invention is described for exemplary purposes, however, with reference to a gaseous mixture of oxygen and carbon dioxide because of the particular importance of these gases in a variety of artificially sustained human environments. Although it is especially adaptable to environs having limited room for an atmospheric control system such as space vehicles, aeroplanes, and submarines, features making the invention attractive for these applications make it equally as attractive for terrestrial environs. Thus, it has potential usage also in tunneling and mining operations, hospital clean rooms, scientific laboratories, and other activities necessarily employing a controlled atmosphere.

Permeability separation systems utilized heretofore have been hampered in the scope of their application and general effectiveness by several well-known obstacles. For example, in applications processing large volumes of mixtures there is required, for separating certain of the constituents of the mixture, selective barriers of relatively large permeation surface areas which in turn necessitate considerable storage room for the system. As the surface area of these selective barriers increases, there is required a concomitantly greater power supply to maintain the necessary pressure drop through them and as a consequence there is needed not only more room for the permeation surfaces but also for the larger power systems. Even in smaller applications which process a relatively high volume of mixture per unit time, such as the aforementioned space vehicle, the power requirements for interstage compression become prohibitive and selective-permeability cells may not be readily used. Available room for the system is also a problem due to the necessity to utilize "cascade" arrangements when the necessary enrichment is not achieved in a single pass of the mixture through the cell system. Thus, the factors of selective barrier surface areas, high power requirements for interstage compression, and multipass or cascade designs, in conjunction with still others, contribute to the obstacles preventing construction of an effective large area, small volume permeation cell.

The present invention is directed to a solution of these problems. Briefly, it consists of compactly stacking on top of one another a plurality of thin membrane-like elements. The material from which they are made exhibits varying permeability characteristics to the components of the mixture. Hermetically disposed within each element is a porous substrate sheet. Another porous sheet is positioned between each element and is in transverse abutting relationship thereto. This sheet functions as a mixture supply conduit means to the membrane-like elements. A unique feed, waste, and enrichment circuit is connected to the various layers in such a manner as to further minimize space requirements for the entire assembly and at the same time reducing the complicated, time consuming, and expensive assembly operations previously used. Due to the transverse arrangement of the membranes and porous sheets an improved interconnection between adjacent cell membranes is permitted, thus enabling increased permeation area within a given volume. As a consequence of these improvements, the aforementioned disadvantages, such as power requirements and room, have been substantially reduced or obviated. In addition, since the driving means of the separation process is a partial pressure gradient, the system is independent of gravity and therefore unaffected by orientation and weightlessness. Also, the selective barriers of each cell are not only chemically inert and stable over relatively wide temperature ranges, but require no regeneration to maintain effective separation. Thus, the cell may operate independently over extended periods of time on a continuous basis, regardless of orientation, requiring minimal power to operate and less room to store.

Still other advantages of this invention, both as to its construction and mode of operation, will be readily appreciated as the same become better understood by reference to the following detailed description when considered in connection with the accompanying drawings in which like reference numerals designate like parts throughout the figures, and wherein:

FIG. 1 shows the structural arrangement of a cell unit;

FIG. 2 is a schematic isometric of an unpotted diffusion cell showing the configuration of stacked cell units and having one sheet of the perm-selective membrane rolled back so as to show the porous substrate therein;

Figure 3:
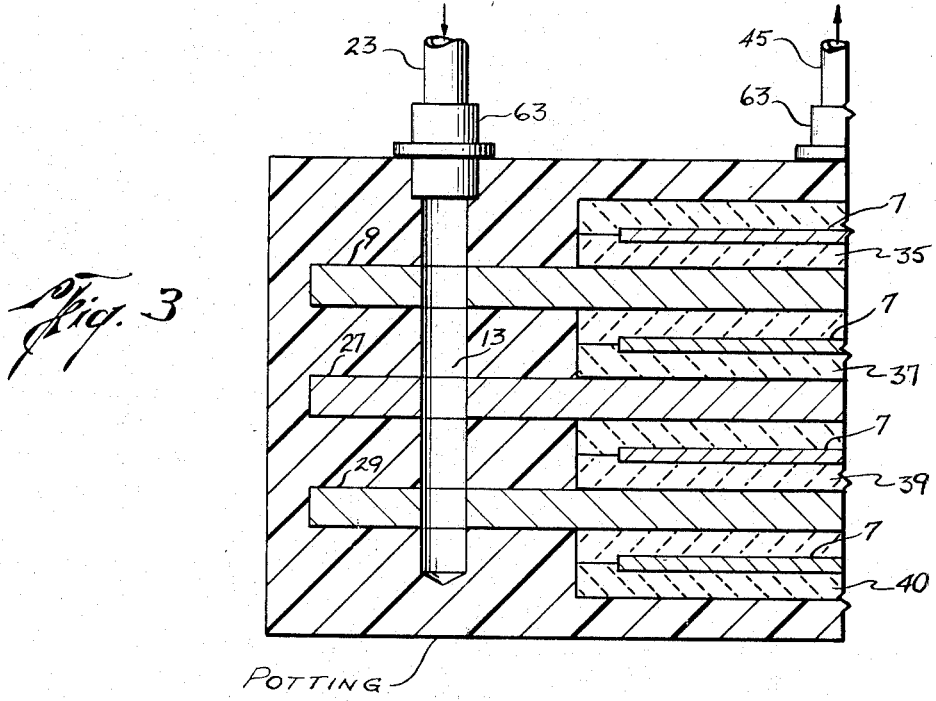
FIG. 3 is a sectional view through one-half of a potted cell, see plane 3—3 of FIG. 2.

Single stage separation of a mixture by permeation involves four basic steps. In the first, a gaseous mixture under pressure, is brought into contact with one side of a perm-selective membrane, that is a membrane of material exhibiting a better permeability characteristic with respect to one or certain of the gases in the mixture than the others. The contact between the gases and the membrane result in their absorption and dissolution upon the latter's surface and as a consequence a partial pressure gradient is produced across the polymeric structure of the membrane. In the second step the gases, under the influence of the partial pressure gradient, begin to permeate the membrane, the direction of permeation being conducted therethrough from regions of high to low partial pressure. The volumetric rate of permeation for each of the components of the mixture will be governed not only by the selective properties of the membrane but also by the magnitude of the partial pressure gradient, assuming a constant temperature. In the third step the permeated gas, now enriched in at least one of the components, is removed, usually as a product, from the downstream or low pressure side of the perm-selective membrane. Removal of the product stream sustains the partial pressure gradient across the membrane and thereby enables its continued separation function. Lastly, the unpermeated and depleted gas is similarly removed, usually as waste, from a port on the high pressure side of the membrane. Since the desired enrichment is not achieved in a single pass through a membrane, a series of passes are generally provided, the exact number of which depending on the required degree of enrichment of the product stream. In connecting numerous of the cells so as to further enrich the product, the depleted gas is merely repassed into the high pressure side of another membrane wherein the above process is repeated. Such an arrangement is referred to hereafter as a cascade.

The permeability cell of the invention is constructed of a plurality of the aforementioned perm-selective membranes disposed each in alternating transverse relationship with a series of feed-waste conduit means made of porous sheets. Each of the membrane-porous sheet structures is referred to as a "cell unit" and is so referred to hereafter. An exemplary cell unit 1 is shown in FIG. 1 and includes a pair of thin, perm-selective membrane elements 3, 5, which may be rectangular or elongate in shape and over which the fluid mixture is passed. The perm-selective films have, sealingly enclosed therebetween, a sheet of porous substrate material 7, the function of which is to absorb and temporarily hold the fluid mixture components which have permeated the membrane elements 3, 5 and to reinforce said elements. Transversely disposed in abutting relation to the membrane elements is another porous sheet 9 which may be of material not unlike that of porous substrate 7. It is likewise rectangular or elongate in shape. The cell unit 1 thus consists of two substrate sheets 7, 9 and two membrane elements or surfaces 3, 5 with one of the substrates 7 sealingly enclosed within the elements and the other transversely arranged with respect thereto. In operation the fluid mixture is fed under pressure through the supply bore 13 which extends through the unlaminated substrate 9. The fluid diffuses through the substrate 9 to the membrane surfaces where, due to the affinity of the membrane material for the mixture, varying portions of the mixture constituents permeate therethrough. One of the enriched fluids is then removed from the cell unit by means of tapping bores 15, 19 which extend through each end of the membrane and enclosed substrate. The other enriched fluid is removed through tapping bore 17 at an end of the porous sheet remote from the entrance end. In that the pressure within the tapping bores 15, 17, and 19 is lower than the supply bore 13, the pressure differential across the perm-selective membrane acts as the vehicle for the entire process.

With reference to FIGS. 2 and 3 there is shown a gas permeability cell constructed in accordance with the present invention. The cell is shown for exemplary purposes to consist of three of the cell units of FIG. 1 stacked in abutting relation to each other, it being understood however that the number of units used per cell will depend upon the necessary volume of fluid to be processed. In the instant case, it is assumed that a gaseous mixture of carbon dioxide and oxygen enters the premeability cell through supply conduit 23 which is connected to bore 13 extending through all of the transversely positioned porous sheets 9, 27, 29. Each of these intermediate substrates thus acts as a passageway supplying adjacent membranes with the gaseous mixture, that is supplying gas to both an upper and lower membrane surface. The membranes, as noted above, are made of a material to which one of the mixture constituents, as for example, the carbon dioxide exhibits a particularly high affinity. The carbon dioxide which thus enters in the mixture through bore 13 is transported to the surfaces of the perm-selective membranes by the transverse substrates whereupon predominant permeation by one of the gases commences due to the pressure differential existing thereacross and to the characteristics of the material from which the membrane is made. The gas which permeates to the enclosed substrate 7 (FIG. 3) arrives from both of the membrane surfaces. If the membranes are, for example, made from the silicon discussed hereafter, a more enriched mixture of carbon dioxide will result within the membranes 35, 37, 39, 40 than was present in the original mixture. The bores 41, 43 extending through each end of all of the membranes and enclosed substrates are connected to common waste conduit 45. It is through these bores that the enriched carbon dioxide mixture is removed as a result of pressure differential existing between them and supply conduit 23. As a consequence of the removal of carbon dioxide from the mixture, the product exiting at bore 17 through conduit 47 is enriched in oxygen. This is likewise accomplished by a pressure differential across each of the transverse substrates. The separating process thus described occurs in each of the permeation units which comprise the cell and it is by reason of their compact overlapping and interconnecting arrangement that only a portion of the volume formerly required is necessary to separate an equivalent amount of gas.

As previously explained, the volumetric rate of permeation for each component of the mixture is governed by the selective properties of the perm-selective membranes and by the magnitude of the pressure differential. In that the selective membrane is the fundamental element in the permeability cell individual attention and experimentation must, in every use, be given to the most appropriate material for use with the mixture being separated. In the case of a carbon dioxide-oxygen mixture various membrane materials were examined. Among the criteria available for making this determination is the "permeability coefficient" of the material. This coefficient, indicates that the permeability and selectivity of a membrane is a measurable parameter, which is different for each individual gas and which varies with the temperature. Its magnitude is an indication of the ease and the degree to which a gas will permeate the membrane; the larger the coefficient the greater being the rate of permeation. Because the permeability coefficient is so descriptive of the membrane's permeability properties, its accurate evaluation is most important.

The gas permeability coefficient for a given gas and membrane is defined as the volume of a pure gas flowing (per time unit) normal to two parallel surfaces a unit distance (thickness) apart, under steady conditions, through unit area under unit pressure differential, at a stated test temperature. As such, the coefficient is a basic property of the material and independent of specimen geometry. It is related to the diffusion rate and to the solubility of a gas by the equation:

$$\bar{P} = DS$$

where $\bar{P}$ = gas permeability coefficient $D$ = diffusivity $\dfrac{\text{(sq. centimeters)}}{\text{second}}$ $S$ = solubility of the gas in the membrane material An accepted unit of $\bar{P}$ is 1 cm.$^3$ (at standard conditions) per sec., cm$^2$, cm. of mercury (pressure) per cm. of thickness at the stated temperature of the test. A convenient unit is the barrer:

$$\bar{P}(\text{barrer}) = \frac{10^{-10} \text{ cm.}^3 \text{ (STP) cm.}}{\text{sec. cm.}^2 \text{ cm. Hg}}$$

In order to determine the relative rate of separation for a binary mixture, one must first determine the ratio of gas permeability coefficients of the component gases for the temperature at which the separation is to take place. If the ratio is greater or less than unity, a separation of the mixture is possible and the rate of separation will be proportional to the relative magnitude of the ratio. Ratios much greater or much less than unity produce the best separations. If the conditions are such that the ratio obtained is equal to unity then the mixture will not separate but will behave as an azeotropic mixture.

The magnitude of the permeability coefficient, i.e. some number $N \times 10^{-10}$, reveals that the flow rates associated with permeation through a membrane are quite small for separations taking place under moderate conditions. A dimensional analysis of the coefficient suggests, however, three variable factors in designing a cell to compensate for these small rates. Thus, (1) if the thickness of the film is decreased, (2) the permeation area increased, or (3) the partial pressure drop increased, then the total amount of permeated gas must increase. Although each of the variables affect the volume of permeated gas, the capability of the membranes to separate the mixture constituents bears profoundly on the volume of product, in this case oxygen, which the cell produces. In this regard, it is noted that membranes made of silicon rubber (particularly Dow Corning 501) have a relatively high permeation rate and good selective properties for removing carbon dioxide from a carbon dioxide-oxygen mixture. Due to varying characteristics of the silicone rubber compositions available, numerous formulations were tested by casting them into films. Their permeability to the pure gases, carbon dioxide, oxygen, and nitrogen was then measured over a temperature range of 5° to 45° C. As indicated by Table 1, each type of elastomer exhibited approximately a 5 to 1 ratio between the carbon dioxide and oxygen permeability coefficient at room temperature, while the carbon dioxide to nitrogen ratio is about 9 to 1 at the same temperature.

PERMEABILITY COEFFICIENTS—SILICONE RUBBER—
TABLE I $$\bar{P} \frac{\text{cm.}^3 \text{ (STP) cm.} \times 10^9}{\text{Sec. cm.}^2 \text{ cm. Hg}}$$

| Silicone Rubber Membrane | T (° C.) | Permeability Constant | | | Separation Factor | |
|---|---|---|---|---|---|---|
| | | CO$_2$ | O$_2$ | N$_2$ | CO$_2$/O$_2$ | CO$_2$/N$_2$ |
| Dow-Corning: | | | | | | |
| RTV-501 | 23.0 | 285 | 53.8 | 25.8 | 5.30 | 11.05 |
| | 32.5 | 278 | 59.3 | 29.2 | 4.69 | 9.52 |
| | 43.0 | 280 | 65.7 | 33.4 | 4.26 | 8.38 |
| | 6.0 | 270 | 42.5 | 18.8 | 6.35 | 14.36 |
| RTV-502 | 23.0 | 286 | 55.3 | 26.3 | 5.17 | 10.87 |
| | 33.0 | 280 | 60.4 | 29.9 | 4.64 | 9.36 |
| | 43.0 | 282 | 66.3 | 34.1 | 4.25 | 8.27 |
| | 10.5 | 269 | 45.9 | 20.7 | 5.86 | 13.00 |
| RTV-40 | 24.0 | 205 | 42.6 | 21.4 | 4.81 | 9.58 |
| | 33.5 | 203 | 45.8 | 23.3 | 4.43 | 8.71 |
| | 43.0 | 197 | 46.8 | 24.1 | 4.21 | 8.17 |
| RTV-11 | 29.0 | 240 | 50.6 | 24.6 | 4.74 | 9.76 |
| | 33.0 | 238 | 51.4 | 25.5 | 4.63 | 9.33 |
| | 43.5 | 235 | 57.1 | 29.0 | 4.12 | 8.10 |
| RTV-601 | 33.0 | 286 | 75.6 | 45.0 | 3.78 | 6.36 |
| | 43.0 | 282 | 77.7 | 47.5 | 3.63 | 5.94 |
| RTV-20 | 28.5 | 191 | 39.9 | 18.8 | 4.79 | 10.16 |
| | 33.0 | 190 | 41.0 | 19.8 | 4.63 | 9.60 |
| | 43.0 | 189 | 45.6 | 25.2 | 4.14 | 7.50 |

In constructing a permeability cell, in accordance with the preceding description, from one of the above silicone rubber compositions such as RTV-501, 4% by weight of the accompanying 501 vulcanizing catalyst is added to the silicone rubber base and thoroughly but carefully mixed so as to avoid the inclusion of excess air. It is drawn out as a film over glass to polymerize at room temperature. This film should be made approximately 10 mils in thickness when in the viscous condition in order to obtain a final thickness of about 5 mils after complete polymerization. The rate of polymerization will depend to a certain extent on both ambient humidity and temperature, it being accelerated at high temperatures and low humidities. The mixture, for example, will be found workable for approximately three (3) hours at room temperature, about 1½ hours at 100° F., and approximately 6 hours at 40° F. The age of the rubber base will also effect the curing times. After a portion of the sheets are fully cured and while others are being cured to the final state, sheets of ordinary paper towel, or other porous paper or material, may be cut into sheets analogous in shape but slightly smaller in area than that of the silicone membrane sheets. These paper sheets are then carefully laid upon cut silicone sheets which have been cured for about 1½ hours and which are therefore still in a tacky state. There is formed a laminated paper-silicone body having the extending perimetrical flange 53 of silicone, as shown in FIG. 1. One of the silicone sheets which has been fully cured (for approximately 3 hrs.) is then picked up and laid upon the laminated body which is still in the rather tacky state. In this manner the flanged silicone edges of the laminated body which are still somewhat adherent, become self sealing upon contact with the cured silicone sheet and there is eliminated the necessity to apply an adhesive in order to construct this three part membrane. Also as a result there is formed a hermetically sealed piece of paper between the silicone sheets which not only serves to strengthen the membrane but permits gas transfer across the paper substrate only by permeation through the membrane.

As an alternative and perhaps advantageous method of construction, it may be advisable to allow the paper-silicone body to completely cure rather than the sole silicone sheet. In this event the sole silicone sheet will be cured for about 1½ hours at which time the fully cured laminated body having the aforementioned perimetrical flange is picked up as a unit and laid upon the sole silicone sheet of identical size which has been only partially cured. The particular advantage in this procedure lies in the more rigid nature of the body which is lifted, the ability to move the top two pieces (laminate) around for positioning purposes, and the better possibility of excluding air bubbles.

When a sufficient number of the membranes have been constructed a series of cell units, i.e. a membrane and its transverse porous sheet, are assembled in abutting relation to each other. The series of units is accomplished merely by stacking (FIG. 1) one unit on top of another, i.e. first a membrane, then a porous sheet, then a membrane and another porous sheet, until the desired number of units is reached. It is thus seen that although a membrane and porous sheet is referred to as a "unit," this is only for purposes of explanation since the porous sheets in reality cooperate each with a pair of membranes, i.e. an upper and lower membrane surface to transport and remove mixture components. The extremities of the membranes (i.e. those portions or areas not in contact with a transverse porous sheet), are bonded to one another as at 57 by the application of fresh silicone 59 to their surfaces. Upon polymerization of this silicone, there is produced a continuous medium or cell body through which a hole may be bored so that each of the units are in fluid communication.

Upon completion of the stacking and bonding of the units, the cell may be wrapped in several sheets of silicone or alternatively given a thin coat of silicone rubber over the entirety of its exposed surface. This final coating is necessary to prevent the epoxy potting compound, used in the finishing stages, from penetrating the porous paper sheets and substrates and ruining them. The silicone covered cell is then placed in a mold filled with the liquid encapsulating epoxy (potting compound) such as the C–4 resin made by Armco Products Co. (with activator W). It should be allowed to set for a period of 6 to 12 hours. Since the resin is generally quite fluid in its unpolymerized state, the cell assembly may easily be centered in the mold and the epoxy allowed to flow around it. Potting of the assembly has been found not only to prevent the occurrence of leaks but also to discourage a rupture which may result from sudden pressure changes or accidental abrasions which may occur during operation of the cell.

After the epoxy has cured, the cell is removed from the mold and the aforementioned bores 13, 17, 41, 43 (see FIG. 2) are drilled through it at the extremities, care being taken that the bores 41, 43 through the membranes each penetrate the paper substrate therein. Similarly, a bore is made through each end of the potted porous sheets which are transversely arranged with respect to the membranes.

Fixedly connected to each of the entry and exit ports of the various bores are plastic or other appropriate conduit means for transporting the mixtures to and from the cell (see FIGS. 2 and 3). The product or oxygen conduit 47 is, for example, connected to bore 17 which extends through the transverse sheets while the waste or carbon dioxide conduit 45 is connected into bores 41, 43 through the silicone membranes. The conduits are preferably made of polyvinyl fluoride tubing and are connected to the cell by means of an annular metal tab 63 having high structural integrity. These tabs may be simply wedged into the cell bore and sealed with an appropriate adhesive or they may be fixedly embedded in the potting body, as shown in FIG. 3. Use of the tabs facilitate connection of the polyvinyl fluoride tubing to the cell and also enhance the strength of the conduit at the point of connection.

Figure 4:
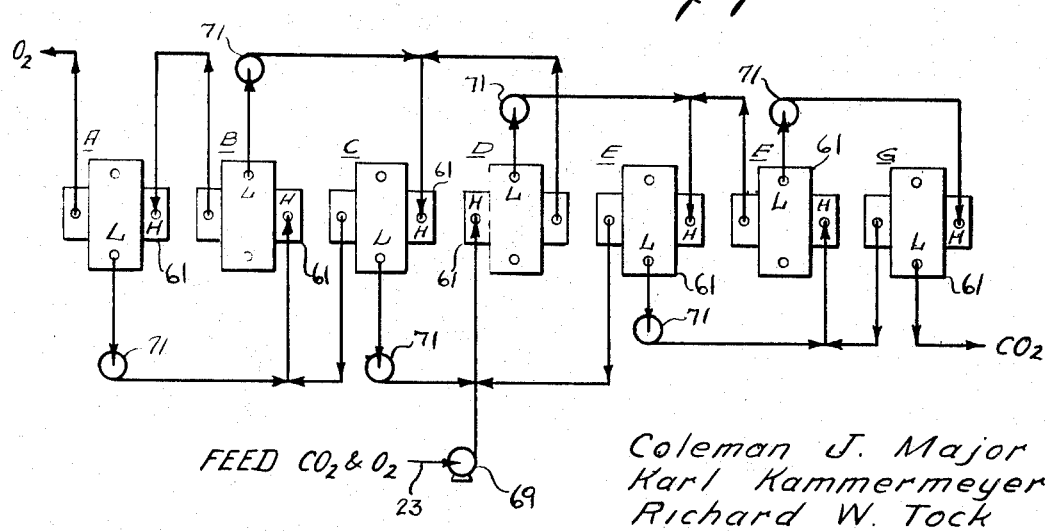
FIG. 4 schematically illustrates a plurality of permeation cells in cascade configuration.

As previously explained, a plurality of passes through a gas permeability cell is often required to achieve the necessary product purity. This may be done by employing a series of cells (as schematically shown in FIG. 4). In this arrangement the cells in stages A through D represent the oxygen enrichment section while stages E through G are stripping stages for the system. The perm-selective membranes in the stages are represented by the line 61, with the high pressure region indicated at H and the low pressure region at L. The conduit 23 leading from the environment to be controlled supplies the carbon dioxide-oxygen mixture first to conventional compressor 69 from which the mixture is fed under pressure into the initial separation stage D. A portion of this mixture permeates the selective membrane to the low pressure side L of the cell. This permeated gas is enriched in carbon dioxide but still contains some oxygen; therefore, it is recompressed upon departure from the cell at compressor 71 and conducted therefrom to the stage E to undergo further stripping. Similarly, the carbon dioxide-oxygen mixture exiting from the low pressure side of stage E is recompressed and conducted to stage F and subsequently to stage G in the same manner. The product stream from the high pressure side of stage E is conducted back into the initial supply conduit 23 for stage D while a similar arrangement is made for stages G to F to F to E. In an analogous manner, the unpermeated gas on the high pressure side of stage D has become enriched in oxygen but still contains a significant percentage of carbon dioxide therein. Thus, it is fed directly to stage C for further oxygen enrichment, with the product therefrom being fed to stage B and hence to A. It is seen that the predominant carbon dioxide mixture exiting from the low pressure side of the oxygen enrichment stages is recompressed in the intermediate compressors 71 in the same manner as the predominant carbon dioxide mixtures exiting from the low pressure side in the stripping stages of the system. The final enriched oxygen product is then withdrawn from the high pressure side of stage A for recirculation back into the controlled atmosphere (not shown). It may be recognized that the arrangement of FIG. 4 represents an ideal cascade circuit in that the effluent from the low pressure side of the stage is assumed to have the same concentration as the feed stream for the next stage to its right, the effluent from the high pressure side is assumed to be the same concentration as the feed stream to its left. Although these assumptions may not be realized, the arrangement nevertheless is considered an effective separation circuit for a plurality of the permeation cells disclosed herein.

While the invention is shown in one general form and in a single application thereof in the drawings, it is not intended to limit it to the specific forms shown. Applications of the cell to the separation not only of gaseous mixtures but other fluids in general are thus apparent, it being necessary of course to choose the optimum separation membrane in each specific case. Therefore, it will be appreciated that other selective membranes, mediums, and constructional procedures may be utilized without departing from the spirit of the invention. It is further contemplated that the construction of the cell may include not only a series of encapsulated substrates having transversely disposed thereto the porous sheets, but it may also include varying arrangements of the encapsulated substrates such as having two membranes with a plurality of porous sheets therebetween. These and still other constructional arrangements of the membranes and porous sheets are considered to lie within the spirit and scope of the invention.

Having thus described the invention, what is claimed and desired to be secured by Letters Patent is:

1. A cell for separating fluid mixture components by permeation through a plurality of stacked permeation units therein, said units each operatively connected to a supply conduit for receiving the mixture and to removal conduits for withdrawing mixture components therefrom, each said unit comprising:

a perm-selective membrane having sealed therewithin a porous substrate sheet for transmitting the permeated component to one of said removal conduits which is in communication therewith;

a porous member in fluid communication with the supply conduit and in abutting relation to said perm-selective membrane so as to conduct the fluid mixture therethrough;

another of said removal conduits also in fluid communication with said porous member so as to remove unpermeated mixture from the unit, said permeation units being in abutting relation to each other with each said porous member disposed intermediate and in surface contact with adjacent membranes to thereby act as a supply and component removal means for a pair of said membranes, said perm-selective membranes being generally elongate in plan view and in aligned relationship with respect to each other, said porous members being also generally elongate in plan view and in aligned relationship with respect to each other with the longitudinal axes of said elongate membranes transverse to the longitudinal axes of said porous members so that only a portion of the surface areas of the abutting membranes and porous members are in contact with each other and provide the permeating surface for the mixture; and said supply conduit and said one of said removal conduits being connected to said porous members on opposite sides of the contacting surface areas.

2. The cell for separating mixture components as recited in claim 1, wherein the perm-selective membrane is in communication with one of said removal conduits by means of a bore which extends therethrough and through the substrate therein, said conduit affixed in the end of said bore.

3. The cell for separating mixture components as recited in claim 2, wherein the removal conduit in communication with said perm-selective membrane is forked adjacent the cell;

a bore extending through each end of the elongate membranes and substrates therein at positions exterior to the contacting surface areas; and each said conduit forks operatively affixed in said bores so as to remove mixture components from the substrates.

4. The cell for separating mixture components as recited in claim 1, wherein the removal conduit in communication with said perm-selective membrane is forked adjacent the cell;

a bore extending through each end of the elongate membranes and substrates therein at positions exterior to the contacting surface areas; and each said conduit forks operatively affixed in said bores so as to remove mixture components from the substrates.

5. A cell for separating fluid mixture components by permeation through a plurality of stacked permeation units therein, said units being operatively connected to a supply conduit for receiving the fluid mixture and to removal conduits for withdrawing mixture components therefrom, each said unit comprising a generally elongate perm-selective membrane having sealed therewithin a porous substrate sheet for absorbing and transmitting the permeated component to at least one of said removal conduits which is in communication therewith, and a generally elongate porous conduit sheet member in fluid communication with the supply conduit and in transverse abutting laminar relationship to said perm-selective membrane for conducting the fluid mixture thereto whereby only a portion of the surfaces of the abutting faces of said membrane and porous conduit sheet member are in contact, said permeation units being disposed in stacked array with each said porous conduit sheet member disposed intermediate and in surface contact with adjacent membranes; and one of said removal conduits being connected in fluid communication with each of said porous conduit sheet members at opposite ends thereof and at opposite sides of the contacting surface areas relative to said supply conduit to facilitate removal of unpermeated components of said mixture.

6. A cell as described in claim 5 wherein said stacked permeation units are encapsulated in a potting medium.

References Cited

UNITED STATES PATENTS

| | | | |
|---|---|---|---|
| 2,597,907 | 5/1952 | Steiner et al. | 55—158 |
| 2,686,154 | 8/1954 | MacNeill | 210—321 |
| 2,966,235 | 12/1960 | Kammermeyer | 55—16 |

OTHER REFERENCES

Stern et al., Helium Recovery by Permeation. In Industrial and Engineering Chemistry vol. 57, No. 2, February 1965, pp. 49 to 60.

REUBEN FRIEDMAN, *Primary Examiner.*

J. ADEE, *Assistant Examiner.*